(12) United States Patent
Streuter et al.

(10) Patent No.: US 8,230,209 B1
(45) Date of Patent: Jul. 24, 2012

(54) METHOD AND APPARATUS FOR AUTOMATICALLY PROVIDING A USER THE OPPORTUNITY TO BOOT FROM AN ALTERNATE STORAGE DEVICE WHERE A VALID OPERATING SYSTEM RESIDES

(75) Inventors: Gary Streuter, San Clemente, CA (US); Randall Deetz, Costa Mesa, CA (US); James Sedin, Ketchum, ID (US)

(73) Assignee: CMS Products, Inc., Costa Mesa, CA (US)

( * ) Notice: Subject to any disclaimer, the term of this patent is extended or adjusted under 35 U.S.C. 154(b) by 75 days.

(21) Appl. No.: 12/554,939

(22) Filed: Sep. 7, 2009

Related U.S. Application Data

(60) Provisional application No. 61/095,585, filed on Sep. 9, 2008.

(51) Int. Cl.
*G06F 9/00* (2006.01)
(52) U.S. Cl. ................................. 713/2; 713/1
(58) Field of Classification Search .................. 713/2, 1
See application file for complete search history.

(56) References Cited

U.S. PATENT DOCUMENTS

| | | | |
|---|---|---|---|
| 6,691,213 B1 * | 2/2004 | Luu et al. | 711/163 |
| 7,024,549 B1 * | 4/2006 | Luu et al. | 713/2 |
| 7,293,166 B2 * | 11/2007 | Nguyen et al. | 713/1 |
| 7,356,677 B1 * | 4/2008 | Rafizadeh | 713/1 |
| 7,480,819 B1 * | 1/2009 | Mahmoud et al. | 714/6.12 |
| 7,650,531 B2 * | 1/2010 | Yeung et al. | 714/5.1 |
| 7,849,300 B2 * | 12/2010 | Hsu et al. | 713/1 |
| 7,945,771 B1 * | 5/2011 | Streuter et al. | 713/2 |
| 2007/0157013 A1 * | 7/2007 | Park | 713/1 |
| 2009/0094447 A1 * | 4/2009 | Yang et al. | 713/2 |

* cited by examiner

*Primary Examiner* — Chun Cao
(74) *Attorney, Agent, or Firm* — Law Office of Scott C. Harris, Inc.

(57) ABSTRACT

Automatically presenting the user, at boot time, the option of booting from a default device or from any of a plurality of storage devices that contain bootable partitions. This overcomes current methodologies that are not automated, needs manually intervention, and requires a degree of sophistication that the user, most probably does not have. This is very simple for the user to use and automatically presents a current and up date list of bootable partitions.

20 Claims, 8 Drawing Sheets

Figure 2B          PRIOR ART
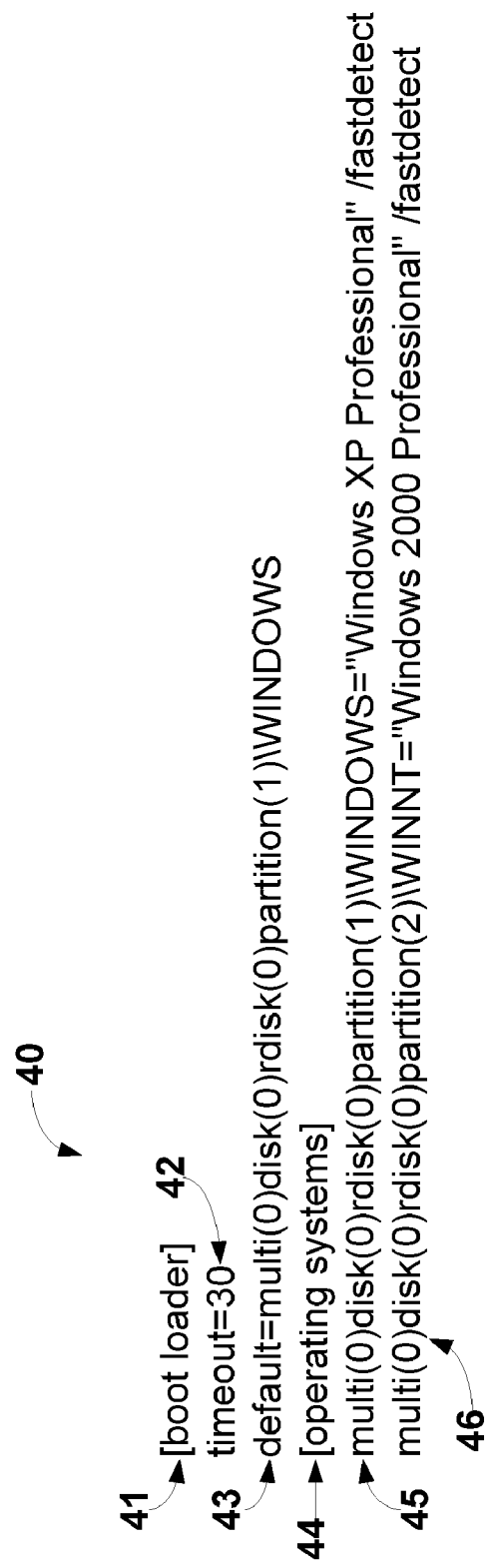

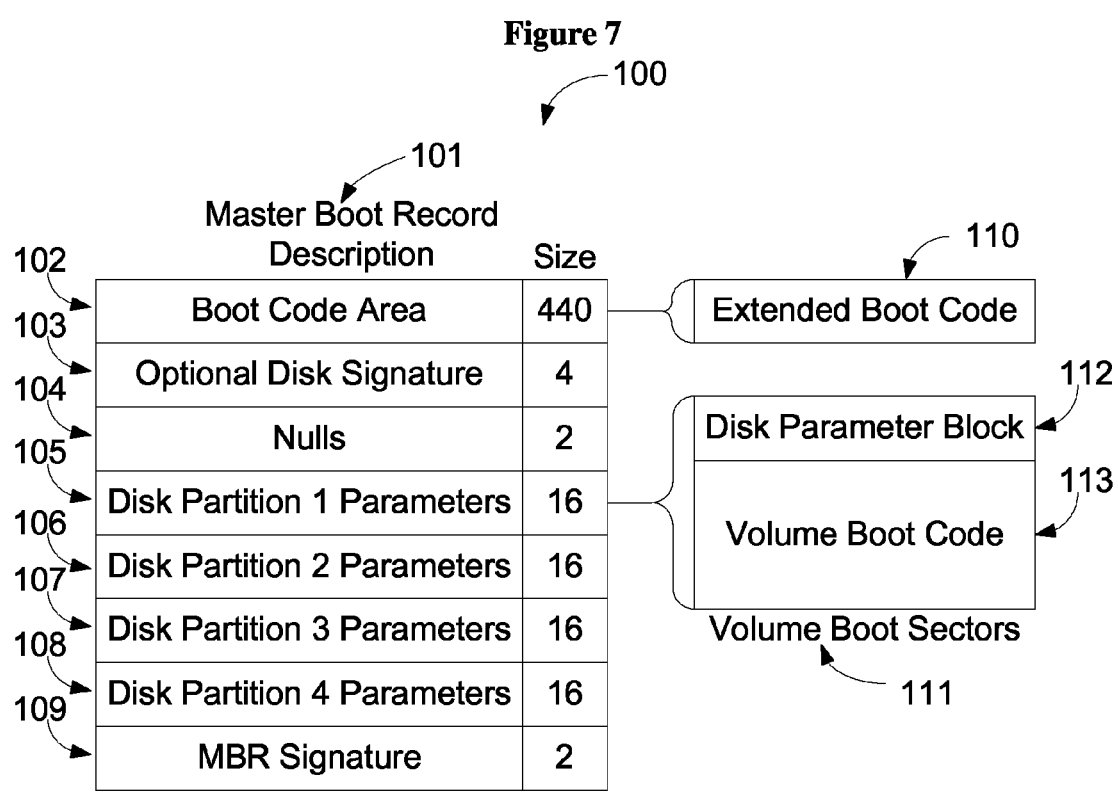

METHOD AND APPARATUS FOR AUTOMATICALLY PROVIDING A USER THE OPPORTUNITY TO BOOT FROM AN ALTERNATE STORAGE DEVICE WHERE A VALID OPERATING SYSTEM RESIDES

This application claims priority from application No. 61/095,585, filed Sep. 8, 2008, the entire contents of the disclosure of which is herewith incorporated by reference.

BACKGROUND

Some versions of the MS WINDOWS® operating system allow the user to select a boot device from a list that is presented to the user at boot time. MS WINDOWS® performs this service through the use of a file named "boot.ini". This file is constructed by the user and permits the user to identify multiple bootable partitions or storage devices that can be selected at boot time from which the user's choice is booted.

SUMMARY

It is an object of embodiments of the present invention to automatically identify storage devices with valid operating systems and construct a list of these storage devices and allow the user to select the storage device/operating system which forms the boot system.

The inventors recognize a shortcoming of this facility is that the user has to identify all of the possible storage devices/ partitions that hold a bootable operating system. If the user attaches an external storage device to the host computer system, that storage device typically will not be listed as a bootable device in the boot.ini file. If the storage device is listed in the boot.ini file and the physical device is not attached to the host computer system and the user selects the device as the boot device, then the boot sequence will fail.

Embodiments address this deficiency in the boot.ini file and other issues, by constructing that file at boot time and presenting the list to the user through a plurality of means. Only storage devices/partitions with bootable operating systems present at boot time will be listed in the boot.ini file or presented to the user through an alternate means.

BRIEF DESCRIPTION OF THE DRAWINGS

Embodiments of the present invention are illustrated by way of example, and not by way of limitation. The following figures and the descriptions both brief and the detailed descriptions of the invention refer to similar elements and in which:

FIG. 2B depicts a boot.ini file with two boot devices;

FIG. 7 depicts changes to the master boot record for an embodiment where the boot code links to an extended boot code area which constructs a new boot.ini file then proceeds with the normal boot sequence.

DETAILED DESCRIPTION OF THE INVENTION

Different ways of altering a boot sequence in a computer are known.

A first way changes the boot sequence in the system BIOS and altering the boot.ini file for those MS WINDOWS® operating systems that use a boot.ini file to allow booting from more than one device.

Figure 1:
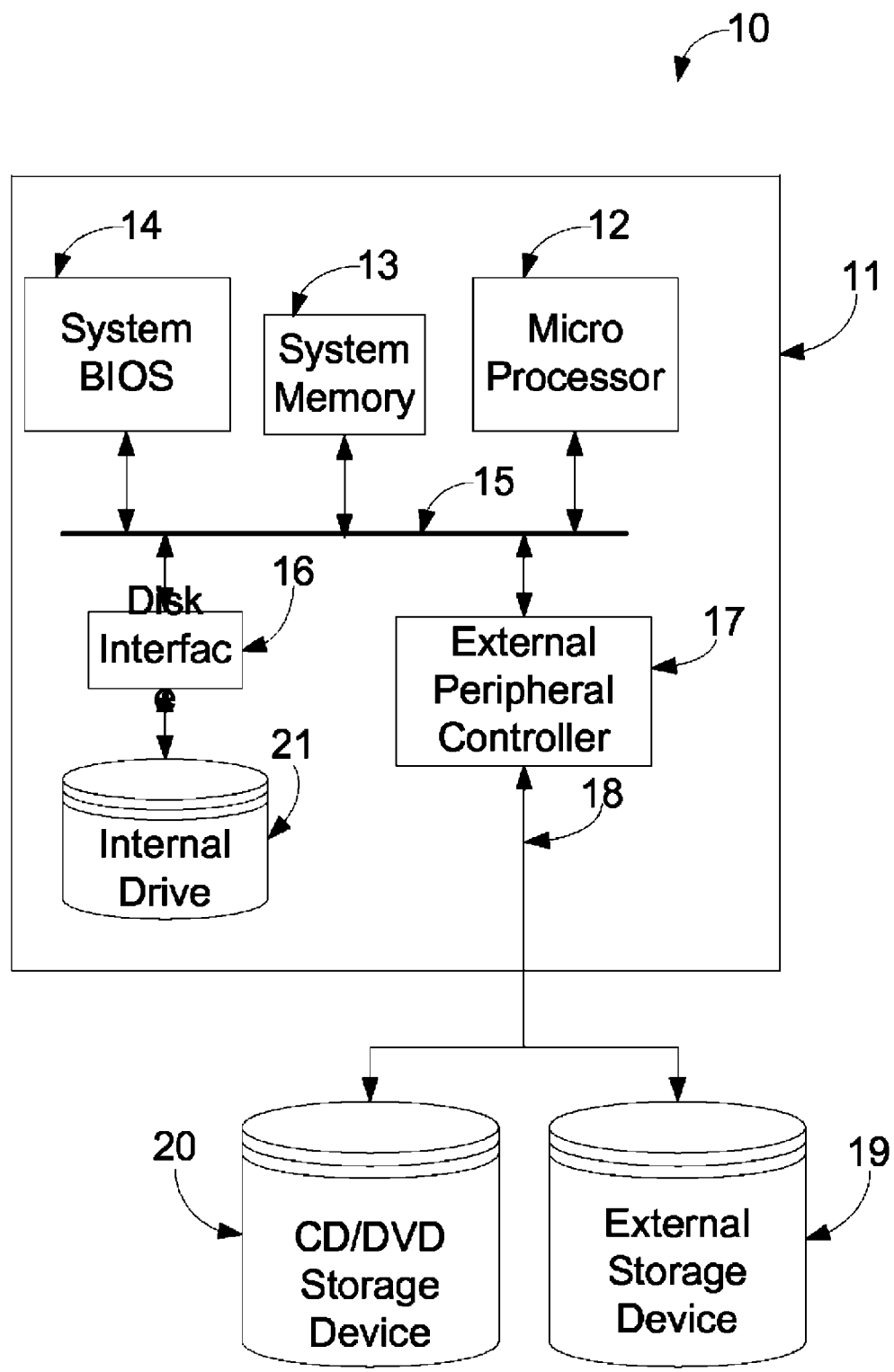
FIG. 1 depicts a normal computer system configuration with a microprocessor, BIOS, system bus, internal system drive, a peripheral controller, and an attached external drive.

Now referencing FIG. 1, 10 depicts a typical desktop, server, or laptop microprocessor based computer system. Computer system 11 contains a microprocessor 12, system memory 13, system BIOS 14, system bus 15, internal drive 16, external peripheral controller 17, external bus 18, and external storage device 19.

The system bios 14 typically has a block of user interface code that can be invoked by the user holding down a predetermined key on the system keyboard. During the bios boot process, bios 14 will check to see if the predetermined key is being depressed by the user. If the key is depressed, system bios 14 will begin executing the user interface. That block of user interface code provides the ability for the user to change the behavior of the boot sequence such that system bios 14 will either attempt to boot from an attached CD/DVD storage device 20, internal drive 16, or external storage device 19.

Any of these storage devices may be selected to the first boot device, the second boot device, or the third boot device. The purpose behind allowing different storage devices to be selected as the first, second, or third boot device is to provide for the case where the primary boot device is defective or the user wants to boot from a device other than the system drive.

Once a boot device has been selected as the primary boot device, the boot sequence is essentially the same regardless of the actual device containing the boot code.

A second method for a user to boot from more than one storage device is through the use of altering the boot.ini file found on MS WINDOWS® systems supporting operating systems such as MS WINDOWS-2000®, MS WINDOWS-NT®, and MS WINDOWS-XP-®.

Figure 2A:
FIG. 2A depicts a boot.ini file with one boot device.

FIG. 2A depicts one such instance of a boot.ini file that supports a single boot device. This file 30, will be displayed to the user at boot time and at the point in the boot sequence where the loader code can read and display this file. In FIG. 2A, 30 is the boot.ini file for a single boot device on the host computer system. Boot loader 31 informs the system that this file is identifying boot devices and is used by the boot loader portion of the operating system. When boot.ini file 30 is executed, the code line timeout=30 (32) tells the boot code to give the user 30 seconds in which to respond before the boot sequence completes loading the operating system specified by default 33.

[In this depiction of the boot.ini file there is only one operating system specified by both default 33 and by the last line 35 which specifies that partition 1 of disk 0 contains an MS WINDOWS XP PROFESSIONAL® version of the MS WINDOWS® operating system. Of course, other operating systems can be indicated.

FIG. 2B depicts another instance of one of a plurality of possible boot.ini files. In this depiction, 40 shows a boot.ini file that support two operating systems. Default line 43 shows that disk 0 partition 1 contains the default operating system. Lines 45 and 46 shows the locations of two operating systems. The first operating system defined by line 45 shows that the location for this operating system is disk 0, partition 1, and that the operating system is MS WINDOWS XP PROFES- SIONAL®. The second operating defined by line 46 shows that the location for the second operating system is disk 0, partition 2, and that the operating system is MS WINDOWS 2000 PROFESSIONAL®.

A drawback of the boot.ini file methodology of presenting additional storage devices or partitions for boot selection is that if one of the additional storage devices is an attached storage device and the device is not currently attached even though the device is still displayed in the list. If the user selects the device, then the boot sequence will attempt to boot from a non-existent device and the boot will fail.

Because many users do not have the degree of sophistication required to change the boot order of system bios 14 or to change the boot.ini file, the embodiments provide, in some cases, an alternative means to allow the user to boot from a device other than internal drive 16. In the case where internal drive 16 contains a corrupted operating system, a means to restore said corrupted operating system or to allow computer system 11 to execute the operating system contained on external storage device 19.

Figure 3:
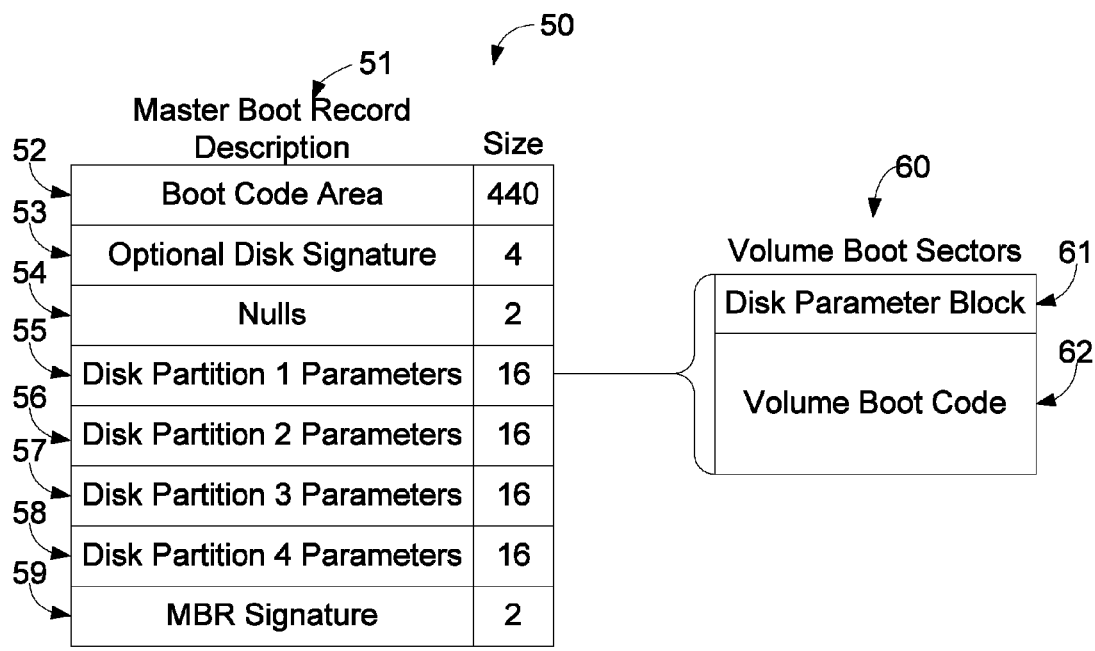
FIG. 3 depicts a normal master boot record and volume boot sectors.

The operation of a normal boot sequence from storage device such as a hard disk drive is first described. Element 50 in FIG. 3 shows the master boot record and volume boot sectors. The master boot record or MBR, is depicted as 51 and the volume boot sectors as 60. MBR 51 is the first sector or sector 0 on a storage device. The MBR 51 is 512 bytes in length. MBR 51 typically contains 440 bytes of machine instructions that can determine of disk partition 1 parameter 55 points to a valid partition on the device and if partition 1 contains an operating system. If disk partition 1 parameter 55 references a partition with a valid operating system, it will point to the first of a series of sectors referred to as volume boot sectors 60. Within these sectors is disk parameter block 61 and volume boot code 62. Boot code area 52 will read volume boot sectors 60 from the same storage device into system memory and transfer processing control to volume boot code 62. Volume boot code 62 contains intelligence of the file system used to manage said storage device. Volume boot code 62 will find the operating system through the file system and read a sufficient amount of the operating system into the system memory and transfer control to it.

Figure 4:
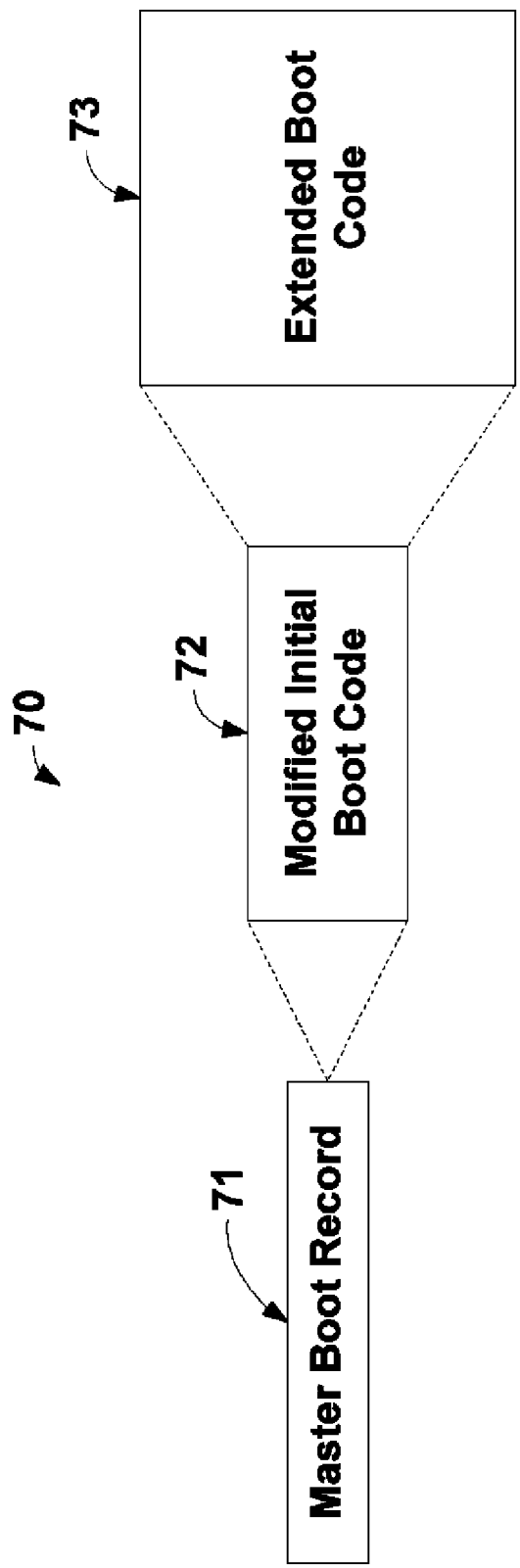
FIG. 4 depicts the master boot record and an extended volume boot sectors.

Element 70 in FIG. 4 where 70 depicts another embodiment. Master boot record 71 is identical to a normal master boot record with the exception that instead of loading the volume boot sectors 60 it loads an intermediate modified initial boot code 72. Modified initial boot code 72 contains the logic to load a still larger block of code extended boot code 73. In the present embodiment of the invention, extended boot code 73 will search for and construct a list of physical interfaces on computer system 11. For computer system 11, this list will contain disk interface 16 for internal drive 21, external peripheral controller 17, and external storage device 19 and CD/DVD storage device 20. Extended boot code 73 will then interrogate each physical interface to determine the type of devices connected to the physical interfaces 16 and 17. Extended boot code 73 will then check master boot records 51 disk partition 'x' parameter blocks 55, 56, 57, and 58 to determine of the disk contains any bootable partitions. Extended boot code 73 will then construct a list containing an entry for each bootable partition on each physical drive. Extended boot code 73 will then display the list to the user and wait for some predetermined amount of time for the user to select one of the bootable partitions.

If the user does not select one of the partitions as the boot partition, extended boot code 73 will boot from the first bootable partition contained on a predetermined storage device. In this embodiment, the default bootable partition would be the fist bootable partition on internal drive 21.

Figure 5:
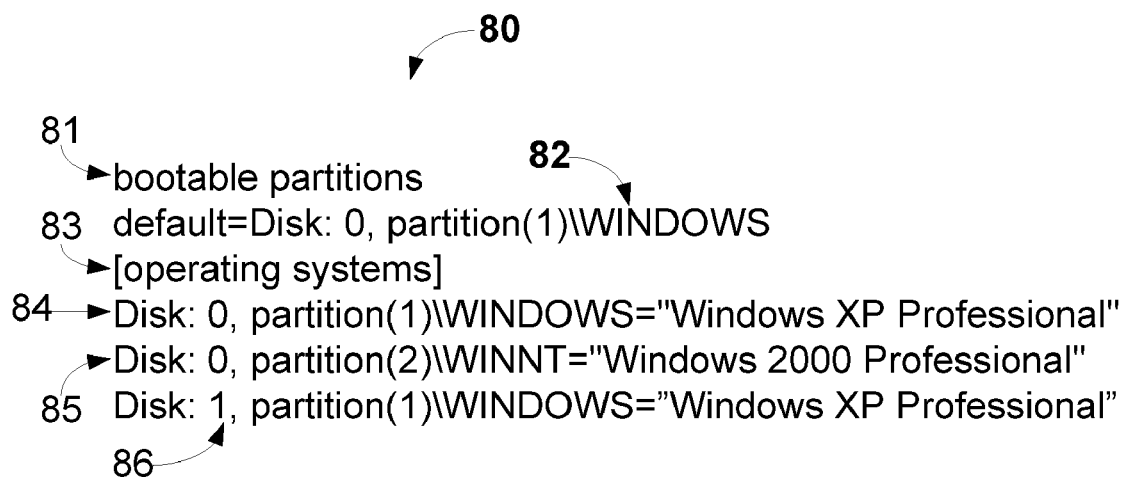
FIG. 5 depicts the text of a display showing all of the bootable partitions that are available presented to the user during the boot process.

FIG. 5 depicts one of the pluralities of bootable device list 80 constructed by this embodiment of the invention. Bootable partitions 81 inform the user that the list shows all of the bootable partitions available to computer system 11. In this list, the user is informed that default partition 82 is contained on disk 0 partition 1. Operating system list 83 contains 3 operating system as disk 0 partition 1 (84), disk 0 partition 2 (85), and disk 1 partition 1 (86). If the user selects one of the three operating systems within the timeout period extended boot code 73 will emulate the normal volume boot sectors 60 and start the boot load of the selected operating system. If the user does not make a selection within the allotted time period, extended boot code 73 will emulate the normal volume boot sectors 60 and start the boot load of the defaulted operating system.

In an alternate embodiment of the invention a fresh boot.ini file will be constructed during the boot sequence. Referring to FIG. 7, the master boot record 101 is shown with boot code area 102 linking to extended boot code 110. Boot code area 102 normally examines the disk partition table made up of disk partition 1 parameters 105 through disk partition 4 parameters 108. Boot code area will attempt to complete the boot sequence by reading and linking to the volume boot sectors 111 pointed to by the first disk partition table entry containing a valid active partition with an operating system. In this example, disk partition 1 parameters 105 is the active partition with an operating system on the drive. Boot code area 102 would normally read into system memory volume boot sectors 111 and link or pass control to volume boot sectors 111. Volume boot sectors 111 would then locate through the file system for the disk partition the operating system boot loader and read it into system memory and then link to it. At that point the operating system boot loader would complete the boot process.

In this embodiment, the boot code area 102 reads and loads into system memory extended boot code 110.

In this embodiment, extended boot code 110 will search and construct a list of physical interfaces on computer system 11.

For computer system 11, this list will contain disk interface 16 for internal drive 21, external peripheral controller 17, and external storage device 19 and CD/DVD storage device 20.

Extended boot code 110 will then interrogate each physical interface to determine the type of devices connected to said physical interfaces 16 and 17.

Extended boot code 110 will then check master boot records 101 disk partition 'x' parameter blocks 105, 106, 107, and 108 to determine of the disk contains any bootable partitions. Extended boot code 110 will then construct a list containing an entry for each bootable partition on each physical drive.

Figure 6:
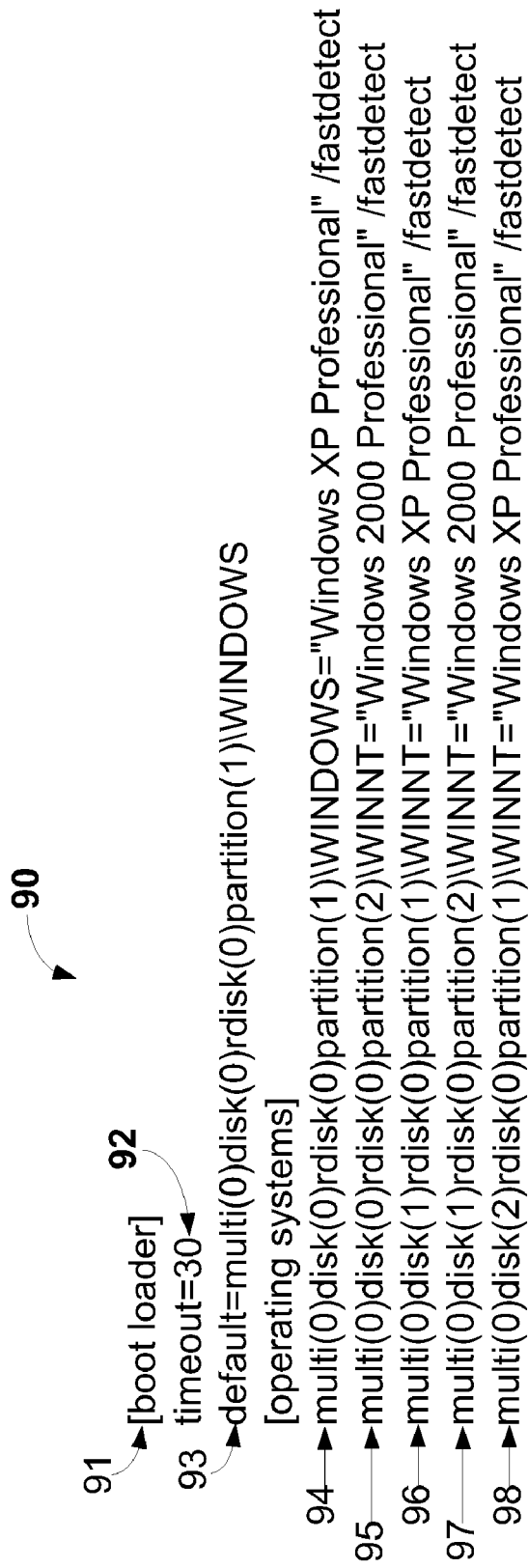
FIG. 6 depicts a fresh boot.ini file constructed during the boot process by the embodiments.

Extended boot code 110 will then format the list into a boot.ini file as shown in FIG. 6 as boot.ini file 90. This constructed file shows that there are 3 physical disks connected to the host computer system. The default 93 operating system is contained on disk 0 partition 1. Looking down the list of disks and partitions with operating systems, the default operating system is identified as 94 which as drive 0 would be the internal system drive. Also present are 4 additional bootable operating systems identified as 95 which is disk 0 partition 2 with a MS WINDOWS 2000 PROFESSIONAL® operating system, 96 which is disk 1 partition 1 with a MS WINDOWS XP PROFESSIONAL® operating system, 97 which is disk 1 partition 2 with a WINDOWS 2000 PROFES- SIONAL operating system, and 98 which is disk 2 partition 1 with a MS WINDOWS XP PROFESSIONAL® operating system.

Extended boot code 110 will then locate, through the operating system on the default drive (disk 0 partition 1), the current boot.ini file and overwrite it with the newly constructed boot.ini file 90. If the current default drive does not have a boot.ini file in the root directory, extended boot code 110 will write the newly constructed boot.ini file 90 in the root directory of the default drive.

The operation uses a software program to relocate the master boot record residing on the primary system drive from its original location to an alternate unused location on the primary system drive, and writes an alternate master boot record in the original location of said master boot record, then stores a first software routine in a location not used by the normal run-time operating system, that routine having knowledge of the said file system used by the original operating system.

Extended boot code 110 will then load volume boot sectors 111 from the default drive and partition table entry disk partition 1 parameters 105 into system memory and link to it. Volume boot sectors will proceed with the normal boot sequence which will result in the boot.ini file being displayed to the user who will then have a predetermined time period 92 to select a operating system to boot.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, while the disclosure describes certain kinds and forms of busses, this disclosure can be used with other forms and kinds of busses.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for creating an alternate boot process for a personal computer that provides for locating and booting alternate operating systems as part of the boot process, comprising:
    a. personal computer comprising
        i. a microprocessor device;
        ii. a flash memory device containing BIOS software that initially operates during the boot process of the computer, as the first thing that is read during the boot process of the computer;
        iii. a random memory device for containing software to be executed and data to be processed;
        iv. an internal bus;
        v. at least a first external bus;
        vi. a first internal storage device attached to the internal bus;
        vii. a second storage device where said second storage device is attached to said first external bus;
        viii. said first internal storage device is initially programmed to act as a primary system drive for said personal computer;
        ix. said primary system drive contains a master boot record, an operating system, and a file system;
    b. a first software application program that:
        i. relocates the said master boot record residing on said primary system drive from its original location to an alternate unused location on said primary system drive; and
        ii. writes an alternate master boot record in the original location of said master boot record, said alternate master boot record loading a routine during the boot operation of said computer that searches for and construct a list of physical interfaces on computer system at boot time, including determining which of said physical interfaces include a bootable partition,
    c. a bios software program residing in the said flash memory device, said bios software program reads said alternate master boot record residing in the master boot record location at said boot operation and
    d. creates a list of bootable partitions and presents said list to a user and prompts said user to select one of the said bootable partitions and after said user selects one of the said bootable partitions, said first software application program initiates the loading and booting from a selected bootable partition.

2. The method of claim 1 where said first internal storage device is one of a rotating magnetic hard disk drive, optical disk drive, or flash memory based storage drive.

3. The method of claim 1, wherein said list is formed by said first software application program, without changing a content of the BIOS of the computer.

4. The method of claim 1 further comprising using said first software application program for compiling an inventory of physical interfaces of said computer system; and
    compiling an inventory of storage devices connected to each said physical interface.

5. The method as in claim 4, wherein said inventory of storage devices comprising:
    a number of partitions contained on each said storage device;
    an operating system assigned drive indicator for each said storage device;
    a path including a drive letter and subfolder structure to the operating system if present on each partition.

6. The method as in claim 4, further comprising presenting a list of bootable storage devices to a user of said computer system and waiting for said user to indicate which storage device is to be booted.

7. The method as in claim 6, further comprising detecting a preference for which storage device to boot from;
    reading into memory that portion of said operating system contained on an indicated storage device; and
    transferring control to said operating system to thereby complete said boot process.

8. The method as in claim 3, further comprising constructing a boot.ini file and writing said boot.ini file as a new boot.ini file on a root of a current system drive replacing an existing boot.ini file.

9. The method as in claim 8, further comprising reading into memory volume boot sectors from said system drive into memory and transferring control to software contained in said volume boot sectors thus allowing the normal boot process to occur with the new said boot.ini file.

10. A computer program product, comprising a non-transitory computer usable medium having a computer readable program code embodied therein, said computer readable program code adapted to be executed to implement a method for creating an alternate boot process for a personal computer that provides for locating and booting alternate operating systems as part of the boot process comprising:
    a. relocating a master boot record residing on a system drive of a computer system from an original location to an alternate unused location on said system drive;
    b. writing an alternate master boot record in said original location;
    c. storing a first routine on the system drive in a location not used by a normal run-time operating system that runs during times when no errors are found, said routine having knowledge of an original operating system's file system, and where said first routine operates to search for and construct a list of all physical interfaces connected to and attached to the computer system at boot time, including determining which of said physical interfaces include a bootable partition and to create a boot time list of active bootable partitions to a user;
    d. linking to said routine during a boot process by said first software application program;
    e. said alternate master boot record initiates said first routine to boot said computer.

11. The product of claim 10 where said system drive is one of a rotating magnetic hard disk drive, optical disk drive, or flash memory based storage drive.

12. The product of claim 10, wherein said list is formed by said routine, without changing a content of a BIOS of the computer.

13. The product of claim 10 further comprising compiling an inventory of physical interfaces of said computer system and compiling an inventory of storage devices connected to each said physical interface.

14. The product as in claim 13, wherein said inventory of physical storage devices comprising:
   a. the number of partitions contained on each said physical storage device;
   b. the operating system assigned drive indicator for each said physical storage device;
   c. the address including the drive letter and subfolder structure to the operating system if present on each partition.

15. The product as in claim 14, further comprising waiting for said user to indicate which active bootable partition from said boot time list of active bootable partitions is to be used to be booted.

16. The product as in claim 15, further comprising detecting a preference for which storage device to boot from;
   a. reading into memory that portion of said operating system contained on said indicated storage device; and
   b. transferring control to said operating system to thereby complete
   c. said boot process.

17. The product as in claim 13, further comprising constructing a new boot.ini file and writing said new boot.ini file on a root of a current system drive replacing any existing boot.ini file.

18. The product as in claim 17, further comprising reading into memory volume boot sectors from said system drive into memory and transferring control to software contained in said volume boot sectors thus allowing the normal boot process to occur with the said new boot.ini file.

19. A method for creating an alternate boot process for a personal computer that provides for locating and booting alternate operating systems as part of the boot process comprising:
   relocating a master boot record residing on a system drive of a computer system from an original location to an alternate unused location on said system drive;
   writing an alternate master boot record in said original location; storing a routine on the system drive in a location not used by a normal run-time operating system, said routine having knowledge of a native operating system's file system;
   linking to said routine during a boot process by said personal computer;
   said alternate master boot record initiates said routine during boot time of the computer to search for and construct a list of all physical interfaces connected to and attached to the computer system at boot time, including determining which of said physical interfaces include a bootable partition and to create a boot time list of active bootable partitions to a user.

20. The method of claim 19, wherein said list is formed by said routine, without changing a content of a BIOS of the computer.

* * * * *